No. 830,682. PATENTED SEPT. 11, 1906.
C. O. SODERQUIST & C. H. FETTEL.
WEIGHING MECHANISM.
APPLICATION FILED SEPT. 14, 1905.
4 SHEETS—SHEET 2.
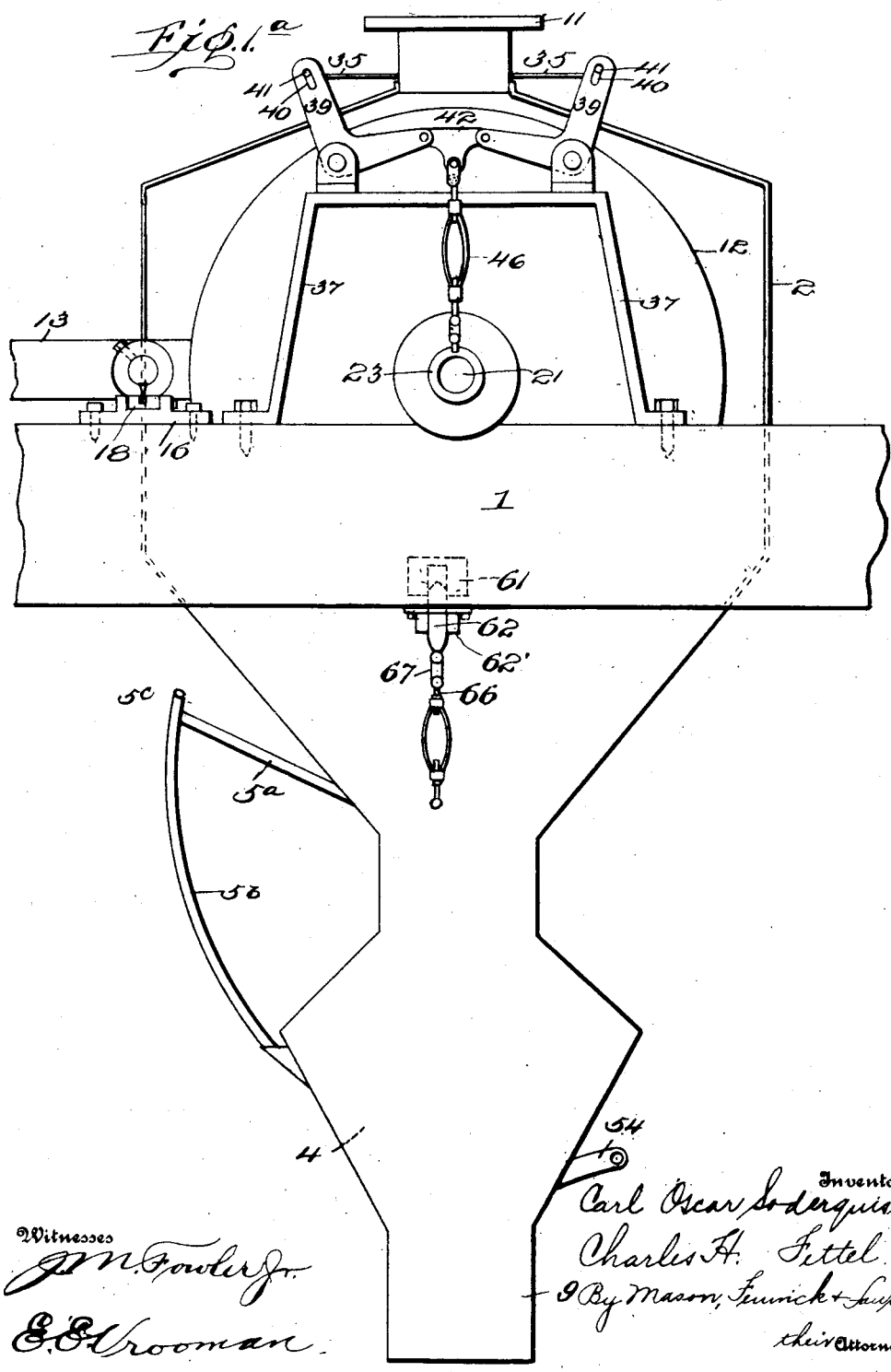
Fig. 1.ᵃ
Witnesses
J. N. Fowler Jr.
E. O. Vrooman
Inventors
Carl Oscar Soderquist
Charles H. Fettel
By Mason, Fenwick & Lawrence
their Attorneys

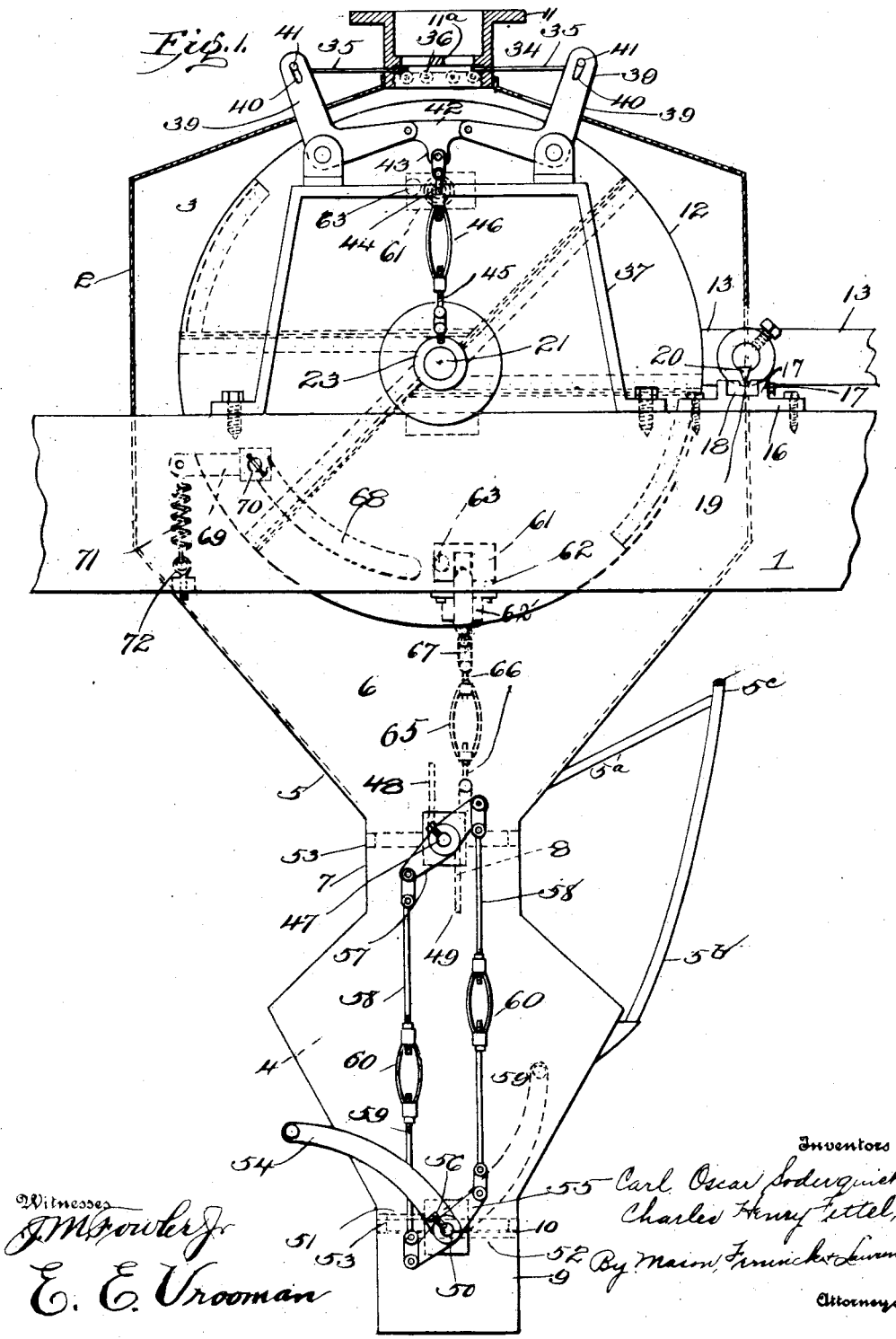

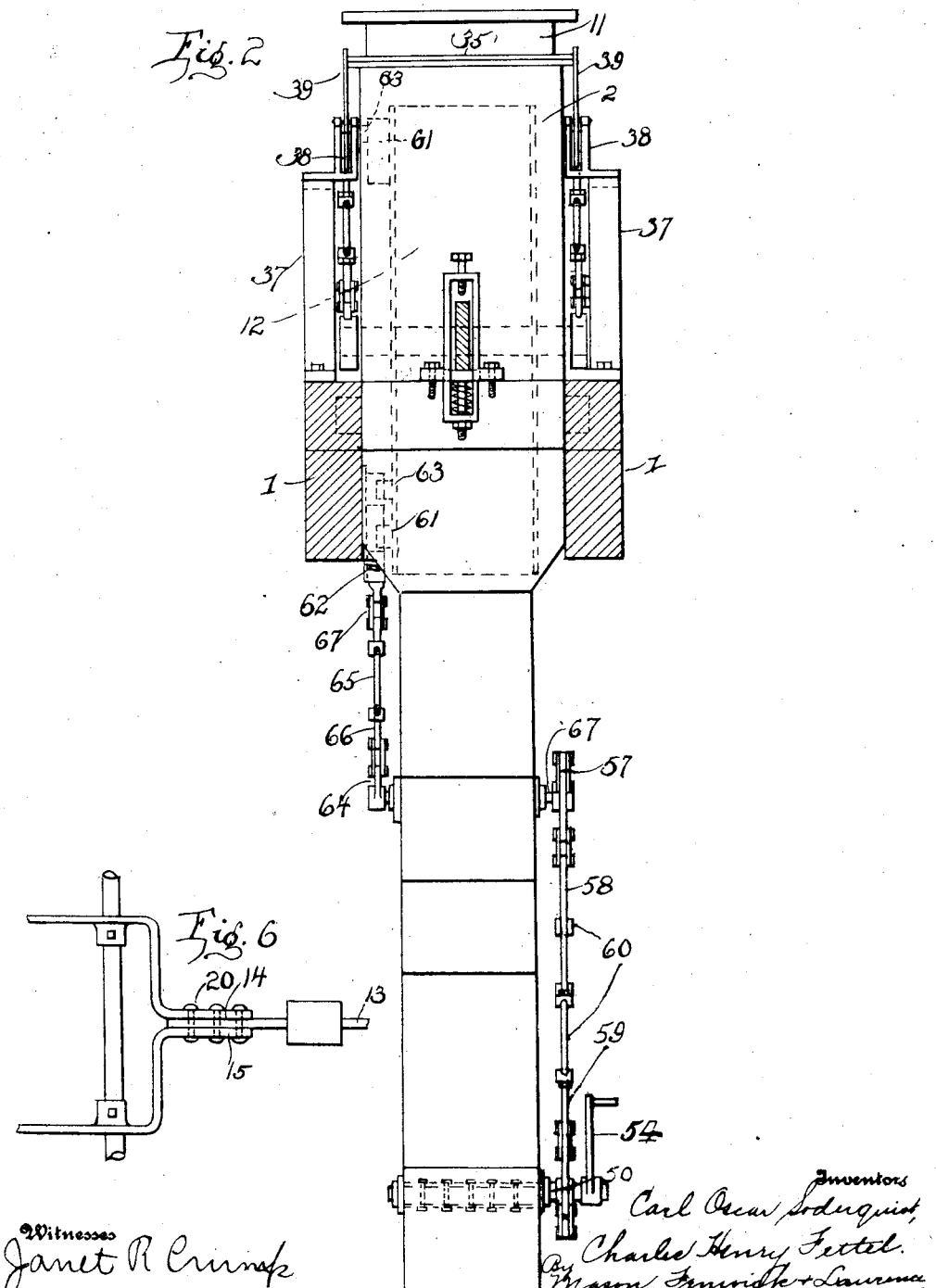

No. 830,682. PATENTED SEPT. 11, 1906.
C. O. SODERQUIST & C. H. FETTEL.
WEIGHING MECHANISM.
APPLICATION FILED SEPT. 14, 1905.
4 SHEETS—SHEET 4.
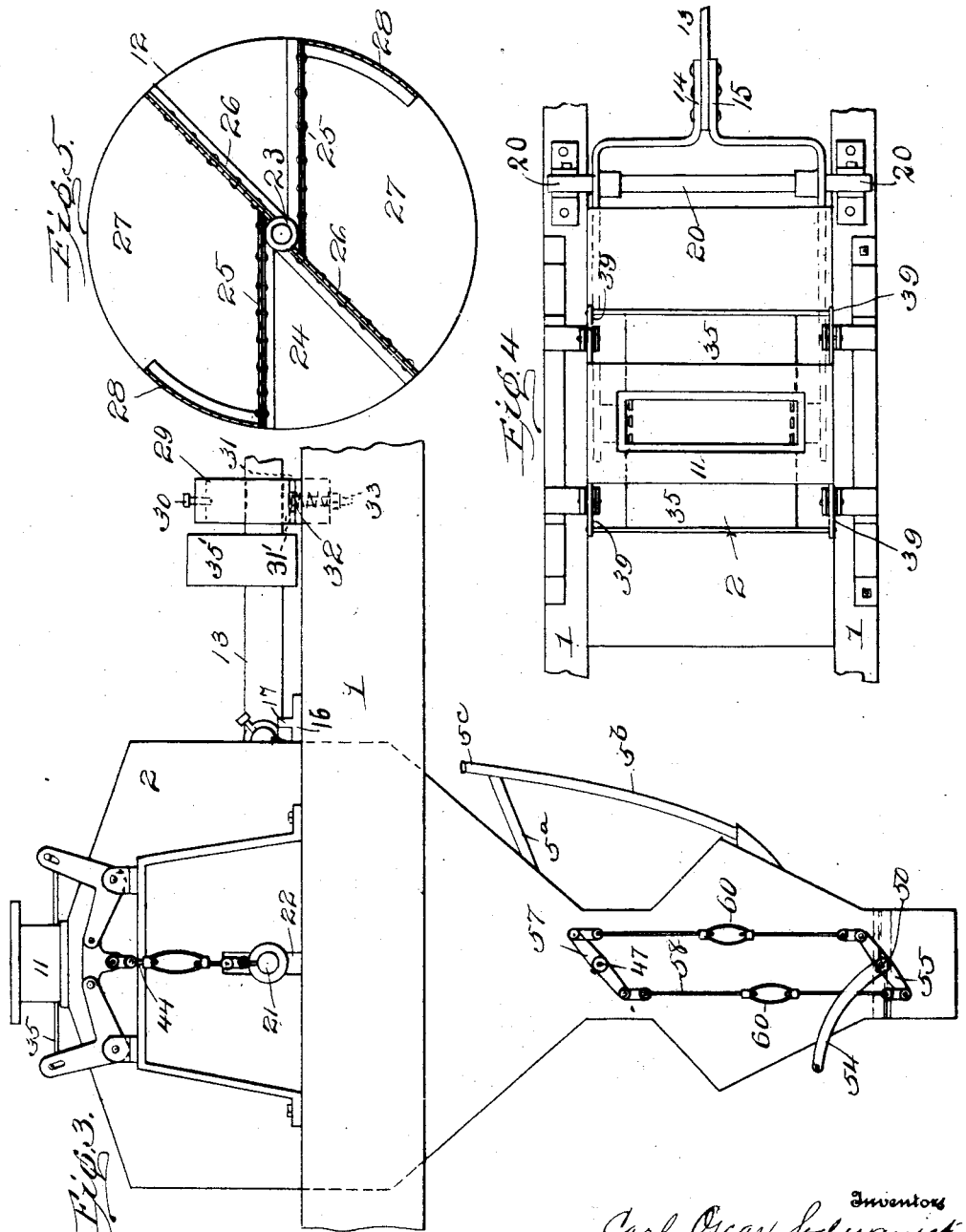
Witnesses
Jesse C. Miller.
E. E. Vrooman.
Inventors
Carl Oscar Soderquist,
Charles Henry Fettel,
By Mason, Fenwick & Lawrence,
Attorneys

UNITED STATES PATENT OFFICE.

CARL OSCAR SODERQUIST AND CHARLES HENRY FETTEL, OF CHICAGO, ILLINOIS.

WEIGHING MECHANISM.

No. 830,682.  Specification of Letters Patent.  Patented Sept. 11, 1906.

Application filed September 14, 1905. Serial No. 278,467.

*To all whom it may concern:*

Be it known that we, CARL OSCAR SODERQUIST and CHARLES HENRY FETTEL, citizens of the United States, residing at Chicago, in the county of Cook and State of Illinois, have invented certain new and useful Improvements in Weighing Mechanisms; and we do hereby declare the following to be a full, clear, and exact description of the invention, such as will enable others skilled in the art to which it appertains to make and use the same.

This invention relates particularly to an automatic weighing mechanism.

One of the several objects in view is the provision of means for facilitating the weighing of any suitable material—as, for instance, grain in bulk—and subsequently discharge the weighed material into a storage-compartment, from which said material is discharged at the will of the operator into a receptacle for transportation.

Another object of the invention is the provision of means for facilitating the automatic handling of material in bulk by employing a mechanism which is provided with a weighing means and a storing and packing compartment or receptacle secured contiguous to said weighing means and which is capable of receiving the material discharged from said weighing means.

With these and other objects in view the invention consists of certain other novel constructions, combinations, and arrangements of parts, as will be hereinafter described, illustrated in the accompanying drawings, and more particularly pointed out in the claims hereto appended.

In the drawings, Figure 1 is a fragmentary view, in side elevation, of a mechanism constructed in accordance with the present invention; and Fig. 1ª is a similar view of the opposite side of the mechanism. Fig. 2 is an end view, in side elevation, of the mechanism depicted in Fig. 1. Fig. 3 is a view in side elevation of a mechanism constructed in accordance with the present invention. Fig. 4 is a top plan view of the mechanism depicted in Fig. 3, parts of the mechanism which are positioned within the casing being shown in dotted lines. Fig. 5 is a transverse sectional view of the rotatable receptacle which is positioned within the casing. Fig. 6 is a top plan view of a scale-beam.

Referring to the drawings by numerals, 1 designates the parallel supports, to which is secured by any suitable means a casing 2. The casing 2 is provided with an upper compartment 3 and a lower storage-compartment 4. The casing 2 is provided with an inclined portion 5, which produces a hopper 6. The reduced portion 5 of the casing 2 terminates in portion 7, in which is positioned valve means 8, hereinafter described. A discharge-chute 9 is also provided with valve means 10, hereinafter specifically described.

A hopper 11 is formed upon the top or upper portion of the casing, through which the material is supplied to the revoluble receptacle 12, journaled upon the scale-beam 13, supported upon the parallel supports or beams 1 1. The scale-beam 13 comprises a pair of parallel members 14 15, Fig. 4, each bowed outwardly for producing a bifurcated scale-beam 13, Fig. 4. A bracket 16, which is provided with a flat base, is supported upon the supports or beams 1. The bracket 16 is provided with parallel extensions 17. Between the parallel vertical extensions 17 is positioned a block 18, which is provided with a recess or cut-out portion 19, formed upon its upper face. Upon opposite sides of the scale-beam 13 are blades 20, which engage the notched or cut-out portion 19 of the block 18. It is to be noted that the scale-beam 13 is fulcrumed upon block 18.

The rotatable receptacle 12 is journaled upon a shaft 21, supported upon the outer ends of the parallel members 14 and 15, which are positioned within the receptacle 2, said shaft being positioned within the elongated slots 22, formed in the casing 2. Secured to the hub portion 23 of the rotatable member 12 are parallel disks or sides 24. Partitions 25 and 26 divide the space between the disks 24 into compartments 27 27. Secured to the disks 24 are segmental plates 28, which close a part of the compartments 27. It will be seen that the rotatable receptacle or bucket 12 is provided, preferably, with a plurality of compartments or pockets, within which the material is positioned which is discharged through the hopper 11. Upon the parallel beams or supports 1 is a bracket 29, which is provided with a central slot of sufficient length to permit of movement of the scale-beam 13 therein. The movement of the scale-beam 13 is limited by an adjustable member—as, for instance, bolt 30—which is carried by the upper portion of the bracket 29. A bolt 31 is carried by the lower portion of the bracket 29 and projects against a follower 31', which engages the scale-beam 13. Upon said bolt 31 is positioned a spring 32. The bolt 31 is provided with a nut 33. By adjusting the bolt 31 the tension of the spring 32 is controlled. Said spring exerts at all times an upward pressure upon the scale-beam 13. The tension of the spring may be such as to force the outer end of the beam upward, and thereby cause the rotatable receptacle to begin to move downward before the desired amount of grain has been discharged into the same, so that the valve means 34, carried by the hopper 11, will begin to close, and upon the discharge of the desired amount of grain into said receptacle said valve means 34 will be entirely closed through not only the action of the spring 32, but the weight of the load in the receptacle. An adjustable weight 35' is carried by the scale-beam 13.

The valve means 34 comprises slidable valve members 35, which are positioned within opposite sides of the hopper 11. Within the hopper 11 are journaled rolls 36, upon which the valve members 35 slide. Upon each side of the casing 2 and positioned upon the supports or beams 1 are angular brackets 37. Upon each of the brackets 37 there are positioned auxiliary brackets 38, which comprise a base portion provided with parallel extensions. Between the parallel extensions of the auxiliary brackets, which are supported by the primary brackets 37, elbow-levers 39 are pivotally mounted. In the upper end of each of the elbow-levers 39 there are formed elongated slots 40, within which lateral projections 41 of the valve member 35 are positioned. When movement is imparted to the elbow-levers 39 for causing adjustment of the valve members 35, the extensions 41 will move longitudinally of the upper portion of the elbow-levers 39 within the elongated slots 40. Each pair of elbow-levers 39 is pivotally connected by means of an intermediate member 42, which is provided with a downward extension 43. The extension 43 of the member 42 carries a threaded rod 44. Secured to the shaft 21 is a threaded rod 45. The rods 44 and 45 are adjustably connected by means of turnbuckles 36. By revolving the turnbuckles 36 upon the threaded rods the valve members 35 can be adjusted through the medium of the elbow-levers 39 and the intermediate connecting members 42. As the rotatable member is carried by the scale-beam 13 and as the crank-arms are carried upon a stationary support—to wit, the angular brackets 37 and the beams 1—when the rotatable member moves downward in a vertical plane the elbow-levers 39 through the medium of the means which connects the same to the shaft 21 will cause the valve members 35 to move together to close the bottom of the hopper 11, and thereby prevent the discharge of material into the revoluble receptacle or bucket 12, positioned within the compartment 3 of the casing 2.

A shaft 47 is journaled within the chute portion 7 of the casing 2, leading to the storing and packing compartment 4. Blades or members 48 and 49 are fixedly secured to the shaft 47 within the chute portion 7, said members 48 and 49 constituting the valve means 8 for closing the lower opening of the hopper 6. A shaft 50 is journaled in the chute portion 9, to which is secured blades or members 51 and 52, constituting the valve means 10 for closing the bottom of the storing and packing compartment 4. It is to be noted that the blades or members 48, 49, 51, and 52 are secured to their respective shafts 47 and 50, preferably on diametrically opposite parts. The blades or members 48 and 49 are adapted to engage a packing or member 53, which constitutes a valve-seat. The blades 51 and 52 are also adapted to engage a removable member or packing 53, which constitutes a valve-seat therefor. Fixedly secured to one end of the shaft 50 is a lever 54, constituting a handle. Upon the opposite end of the shaft 50 is fixedly secured a lever 55 by means of the bolt 56. Fixedly secured to one end of the shaft 47 is a lever 57, which is of similar structure as lever 55 and is also adjustably secured to the shaft 47 similar to lever 55. The ends of the levers 55 and 57 are adjustably connected by means of threaded rods 58 and 59 and turnbuckles 60. When the lever 54, constituting a handle, is in the position shown in Fig. 1, the lower valve means 10 will be closed and the upper valve means positioned within the chute portion 7 will be opened. Upon swinging the lever 54 to the position shown in dotted lines, Fig. 1, the lower valve means will be opened and the upper valve means closed. The movement of the valves is entirely optional with the operator of the mechanism.

A locking device for preventing rotary movement of the rotatable receptacle or bucket 12 is employed, which coacts with the upper and lower valve means 8 and 10, respectively. This locking device comprises a notched or recessed plate 61, secured upon one of the beams or supports 1. Slidably secured to the same beam 1 is a plunger or bolt 62, which is adapted to be normally positioned within the notched or recessed portion of the plate 61, Fig. 1. The cut-out portion of the locking-plate 61 is of sufficient depth to permit of vertical movement of the receptacle or bucket 12 with the plunger or bolt 62, positioned therein. Rolls 63 are secured upon one side of the receptacle contiguous to the plate 61. The plunger or locking-bolt 62 is connected by adjustable means to an arm 64, fixedly secured to one end of the shaft 47. This adjustable means is similar in structure to the means connecting the ends of the levers 55 and 57—that is to say, a turnbuckle 65 is positioned upon rod and link members 66 and 67, respectively, which are pivotally connected to the plunger or locking-bolt 62 and the arm 64.

Brake means is employed for retarding the rotary movement of the rotatable receptacle or bucket 12. This brake means comprises a curved or angular arm 68, which is provided with an integral horizontal apertured extension 69. The removable arm 68 is pivotally secured, as at 70, to the inside of the casing 2 contiguous to the side of the receptacle 12, which is provided with the rolls 63. Within the outer apertured end of the horizontal extension 69 one end of a spring 71 is secured, the opposite end of the spring being adjustably secured, through the medium of a bolt 72, to the casing 2 and one of the supports or beams 1. The tension of the spring 71 can be controlled by adjusting the bolt 72, thereby causing a greater frictional resistance to be exerted upon the rolls 63 as they come in contact with the upper surface of the curved brake-arm 68 when the receptacle 12 rotates. When the lever 54 is swung to the position shown in dotted lines, Fig. 1, the plunger or slidable bolt 62 will be withdrawn from the locking-plate 61, and if the receptacle 12 contains grain or any other material the weight of the load will cause the receptacle to rotate and one of the rolls 63 will engage the brake-arm 68, and consequently retard the movement of the receptacle 12.

The vertical movement of the receptacle or bucket controls the movement of the valve means 34, so that when a predetermined amount of material has been discharged into the receptacle or bucket 12 valve members 35 will close the hopper. It is to be noted that a partition 11ª is formed centrally in the hopper 22, so that the engaging ends of the valve members 35 are covered when said members are in their closed position.

Through the action of the spring 32 the receptacle 12 will begin to move downwardly before the desired amount of material has been deposited therein. Upon the exact amount of material being discharged into one compartment of the receptacle through the hopper 11 the valve means 34 will be entirely closed through the action of said spring and the weight of the load.

Vent-pipes 5ª and 5ᵇ are carried by the side of the casing and communicate with the compartments 6 and 4, respectively. These pipes 5ª and 5ᵇ are integral, terminating in an upper single pipe 5ᶜ. The pipes 5ª and 5ᵇ are employed for permitting of the passage of dust or dirt from within the compartments.

The position of the parts as shown in Fig. 1 preferably illustrates the mechanism when the rotatable receptacle is empty. It will be noted that the valves 35 are in their open position, so that any grain deposited in the hopper will pass into one of the compartments of the rotatable receptacle. Upon withdrawing the plunger or sliding bolt 62 by actuating the lever-arm 54, which is connected to said plunger, the rotatable receptacle 12 is free to revolve within the casing 2. If one of the compartments contains material, which has preferably been placed therein through the valved hopper, the receptacle will revolve upon its axis, causing one of the rollers 63 to engage the brake-arm 68 during the rotary movement of said receptacle, and as the tension of the spring 71 upon said arm is sufficient to nearly stop the rotary movement of the receptacle before said roller has passed off of said brake-arm it will be easy to cause the plunger 62 to move into the recess of plate 61. When the recess of said plate 61 is exactly opposite the plunger 62, the receptacle will be practically stationary, not only through the medium of the brake-arm, but for the fact that it is emptied when it reaches this position, as the compartment which was loaded is entirely dumped, while another empty compartment is placed beneath the valve-hopper carried by the casing 2.

What we claim is—

1. A mechanism of the class described, comprising a support, a stationary casing carried by said support, said casing provided with an upper and a lower compartment, upper and lower valve means positioned within said casing, a rotatable, vertically-movable receptacle positioned within the upper compartment of said casing, locking means positioned within said casing for preventing rotary movement of said receptacle, and means connecting said valve means and locking means and being capable of imparting synchronous movement thereto.

2. A mechanism of the class described, comprising a casing, a vertically-movable and rotatable receptacle positioned within said casing, said casing provided with a lower compartment, valve means for closing the ends of said lower compartment, and locking means for preventing rotary movement of said receptacle.

3. In a mechanism of the class described, the combination with a support, of a rotatable receptacle carried by said support, said receptacle, comprising disk-shaped sides, parallel partitions, constituting bottoms secured between said sides, substantially straight partitions secured between said sides at an angle to said parallel partitions, and curved end portions secured between said sides, said partitions end portions and sides producing compartments in said receptacle.

4. In a mechanism of the class described, the combination with a support, of a stationary casing provided with upper and lower compartments carried by said support, a scale-beam carried by said support and extending into the upper compartment of said casing, a rotatable receptacle provided with compartments carried by the scale-beam within the upper compartment of said casing, brake means carried by said support and coacting with said receptacle, locking means for preventing rotary movement of said receptacle, and valve means carried by said casing contiguous to the lower compartment.

5. In a mechanism of the class described, the combination of a casing provided with an upper and lower compartment, valve means formed upon the upper portion of said casing, a movable receptacle positioned within the upper compartment of said casing, means connecting said receptacle to said valve means, brake means for retarding movement of said receptacle, and valve means for closing the lower compartment.

6. In a mechanism of the class described, the combination with a support, of a casing carried by said support, a rotatable receptacle positioned in the upper portion of said casing, locking means for preventing rotary movement of said receptacle, valve means carried by said casing, and means for synchronously actuating said locking and valve means.

7. In a mechanism of the class described, the combination of a casing provided with a storage-compartment, valves for closing the upper and lower portions of said storage-compartment, means for synchronously actuating said valves, a rotatable and vertically-movable receptacle positioned within the casing, valve means for closing the upper end of said casing, means connecting said valve means with said receptacle, and locking means for preventing rotary movement of said receptacle.

8. In a mechanism of the class described, the combination with parallel supports, of a stationary casing provided with an upper and a lower storage compartment, positioned between said supports, a hopper formed upon the upper portion of said casing, rolls journaled within said hopper, a bracket positioned upon said supports, crank-arms mounted upon said brackets, valve members positioned within said hopper in engagement with said rolls and connected to said crank-arms, a rotatable and vertically-movable receptacle positioned within the upper compartment of said casing, adjustable means connecting said crank-arms and said receptacle, valves positioned within the lower portion of said casing and closing the upper and lower ends of the lower storage-compartment, adjustable means connecting said valves, rolls secured to said receptacle, a movable brake-arm secured to said casing, a spring adjustably secured to said casing and said brake-arm, said rolls adapted to engage said brake-arm for retarding rotary movement of said receptacle, and slidable locking means for permitting of vertical movement of said receptacle and preventing rotary movement thereof.

9. In a mechanism of the class described, the combination of a casing provided with an upper and a lower compartment, the lower compartment provided with upper and lower openings, synchronously-actuated valves for closing one of said openings and opening the other, rotatable weighing means positioned within the upper compartment of said casing, brake means coacting with said weighing means, and locking means for preventing rotary movement of said weighing means.

10. In a mechanism of the class described, the combination with a support, of a scale-beam carried by said support, means for exerting an upward pressure upon said scale-beam, rotatable weighing means carried by said scale-beam, brake means coacting with said weighing means, and manually-operated, slidable locking means for preventing rotary movement of said weighing means.

11. In a mechanism of the class described, the combination with a support, of a plate secured to said support, a removable member provided with a cut-out portion upon its upper surface, carried by said plate, a scale-beam provided with blades, said blades engaging the cut-out portion of said removable member, means for exerting an upward pressure upon said scale-beam near one end thereof, means for limiting pivotal movement of said scale-beam, a weight carried by said scale-beam, and weighing means carried by said scale-beam.

12. In a mechanism of the class described, the combination with a support, of a scale-beam carried by said support pivotally mounted thereon, a bracket carried by said support, the scale-beam extending through said bracket, a spring positioned upon said bracket and adapted to exert an upward pressure upon said scale-beam, adjustable means carried by said bracket for limiting vertical movement of said scale-beam, an adjustable weight carried by said scale-beam, and weighing means carried by said scale-beam.

13. In a mechanism of the class described, the combination with a support, of a casing provided with an upper and a lower storage-compartment carried by said support, the lower compartment provided with upper and lower openings, a valved hopper formed upon the upper portion of said casing, movable weighing means positioned within the upper compartment of said casing, brake means for limiting movement of said weighing means, and locking means for preventing movement of said weighing means.

14. In a mechanism of the class described, the combination with a support, a casing carried by said support, of a hopper formed upon said casing, rolls journaled in said hopper, valve means positioned within said hopper and in engagement with said rolls, movable weighing means positioned within said casing, and means connecting said weighing means and the valve means of the hopper.

15. In a mechanism of the class described, the combination with a casing, of a hopper carried by said casing, rolls journaled in said hopper, slidable valve members positioned within said hopper and in engagement with said rolls, a rotatable and vertically-movable receptacle positioned within said casing, means connecting said valve members and receptacle and being capable of actuating the same, when vertical movement is imparted to the receptacle.

16. In a mechanism of the class described the combination of a casing provided with an upper and a lower storage-compartment, valve means carried by said casing, rotatable and vertically-movable weighing means positioned within the upper compartment of said casing, and brake means for controlling movement of said weighing means.

17. In a mechanism of the class described, the combination of a casing provided with an upper and a lower storage-compartment, valve means carried by said casing, integral vent-pipes carried by said casing and communicating with said compartments, said pipes terminating in an upper, single pipe or tube.

18. A mechanism of the class described, the combination with a support, of a casing provided with an upper and a lower storage-compartment carried by said support, the lower compartment provided with upper and lower openings, valves for closing said openings, a valved hopper positioned upon the upper portion of said casing, and weighing means positioned within one of said compartments.

19. In a mechanism of the class described, the combination of a casing provided with an upper and a lower compartment, weighing means positioned within the upper compartment, said lower compartment provided with open ends, and valve means for closing said ends.

20. In a mechanism of the class described, the combination with a support, a casing carried by said support, of a hopper carried by said casing, rolls journaled in said hopper, slidable members carried by said hopper and in engagement with said rolls, means for actuating said members upon said rolls, weighing means positioned within the upper portion of said casing, and valves positioned within the lower portion of said casing.

21. In a mechanism of the class described, the combination of a casing provided with an upper and a lower storage-compartment, and integral vent-pipes engaging said casing and communicating with said compartments.

22. In a mechanism of the class described, the combination of a casing provided with compartments, and integral vent-pipes engaging said casing communicating with said compartments, said pipe terminating in a single pipe or tube.

23. In a mechanism of the class described, the combination with a support, a revoluble receptacle carried by said support, of an arm pivotally mounted upon said support, said arm comprising a straight and a curved portion, yielding means connecting the straight portion of said arm to said support, and means carried by said receptacle and adapted to engage the curved portion of said arm and travel the length of said portion when rotary movement is imparted to said receptacle.

24. In a mechanism of the class described, the combination of a casing provided with an upper and a lower compartment, a revoluble receptacle positioned within said upper compartment, brake means for limiting rotary movement of said receptacle, valve means carried by said casing, and means for locking said receptacle in a stationary position.

25. In a mechanism of the class described, the combination with a support, of a rotatable receptacle carried by said support, a notched or recessed plate carried by said receptacle, a slidable plunger carried by said support and adapted to be positioned within the notched portion of said plate for preventing movement of said receptacle, and means for adjusting said plunger.

26. In a mechanism of the class described, the combination of a casing provided with an upper and a lower compartment, the lower compartment open at its upper and lower ends, valve means positioned upon said casing and capable of closing the ends of said lower compartment, and means for synchronously actuating said valve means for opening one of the open ends of said compartment while closing its other end.

27. In a mechanism of the class described, the combination with a support, of a substantially rectangular bracket carried by said support, a scale-beam pivotally mounted upon said support and extending through said bracket, weighing means carried by said scale-beam, said bracket provided with a slidable member, yielding means engaging said member and bracket and capable of exerting an upward pressure upon said scale-beam, an adjustable member revolubly mounted upon said bracket, and an adjustable weight carried by said scale-beam.

28. In a mechanism of the class described, the combination with a support, a casing carried by said support, of a hopper positioned above said casing, slidable valve members carried by said hopper, elbow-levers pivotally mounted upon said support, means for connecting said levers to said slidable valve members, movable weighing means carried by said support, and means connecting said weighing means and levers and being capable of actuating said levers and valve members when movement is imparted to said weighing means.

29. In a mechanism of the class described, the combination with a support, of a rotatable receptacle carried by said support, a notched or recessed plate carried by said receptacle, a roller carried by said plate, brake means carried by said support and adapted to be engaged by said roller for retarding movement of said receptacle, and slidable locking means carried by said support and adapted to be positioned within the notch of said plate for locking said receptacle against rotary movement.

30. In a mechanism of the class described, the combination with a support, of a rotatable receptacle carried by said support, said receptacle provided with a plate or extension having a recess, slidable locking means positioned within the notch of said plate, said receptacle pivotally mounted upon said support, said locking means permitting said pivotal movement of said receptacle upon said support and preventing rotary movement of said receptacle.

31. In a mechanism of the class described, the combination with a support, a rotatable receptacle carried by said support, a roller carried by said receptacle, a brake-arm provided with a curved extension, carried by said support, the roller of said receptacle adapted to travel the entire length of said curved extension, and elastic means connecting said brake near one end of said support.

32. In a mechanism of the class described, the combination with a support, of a scale-beam carried by said support, a receptacle carried by said scale-beam, a bracket carried by said support, said beam extending through said bracket, said bracket provided with an adjustable member threaded into its upper portion, an adjustable member threaded into its lower portion, and a spring positioned upon said last-mentioned member and engaging said scale-beam and normally exerting an upward pressure upon said beam.

In testimony whereof we affix our signatures in presence of two witnesses.

CARL OSCAR SODERQUIST.
CHARLES HENRY FETTEL.

Witnesses to Soderquist's signature:
ARTHUR W. NELSON,
ERIC LINDHOLM.

Witnesses to Fettel's signature:
J. C. HANSON,
JACOB H. BAUMAN.